United States Patent
Nakane et al.

(10) Patent No.: US 6,730,435 B1
(45) Date of Patent: May 4, 2004

(54) ACTIVE MATERIAL FOR NON-AQUEOUS SECONDARY BATTERY, AND NON-AQUEOUS SECONDARY BATTERY USING THE SAME

(75) Inventors: Kenji Nakane, Tsukuba (JP); Yasunori Nishida, Tsukuba (JP); Hiroshi Ogawa, Ibaraki (JP); Yoshihiro Kawakami, Moriya (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/690,758

(22) Filed: Oct. 18, 2000

(30) Foreign Application Priority Data

Oct. 26, 1999 (JP) ............................................ 11-303957

(51) Int. Cl.$^7$ .......................... H01M 4/38; H01M 4/48; H01M 6/14
(52) U.S. Cl. ................... 429/218.1; 29/623.1; 429/223; 429/224; 429/231.1; 429/231.95
(58) Field of Search ................................ 429/223, 224, 429/231.1, 231.3, 213, 278.1, 231.8, 231.95; 29/623.1

(56) References Cited

FOREIGN PATENT DOCUMENTS

| JP | 9-55210 | 2/1997 |
|----|---------|--------|
| WO | WO 97/49136 | 12/1997 |

*Primary Examiner*—Stephen Kalafut
*Assistant Examiner*—Tracy Dove
(74) *Attorney, Agent, or Firm*—Sughrue Mion, PLLC

(57) ABSTRACT

Provided is an active material for a non-aqueous secondary battery having improved safety while maintaining the capacity and the cycle characteristic, a process for producing the same, and a non-aqueous secondary battery using the same. The active material can be doped/undoped with an alkali metal ion; the active material is a compound particle comprising three or more of constituting elements, and contains an element A selected from Li, Na, K, Mg, Ca, Sr, Ba, B, Al, Ga, In, Si, Zr, Sn, Ti, V, Cr, Mn, Fe, Co, Ni, Cu, Ag and Zn as one of the constituting elements; the particle has a region where the concentration of element A is decreasing continuously in the direction of from the particle surface to the particle core; and the ratio (d/D) of the mean width (d) of this region towards the depth direction to the mean radius (D) of the particle is $0.001 < d/D < 0.5$.

10 Claims, No Drawings

ACTIVE MATERIAL FOR NON-AQUEOUS SECONDARY BATTERY, AND NON-AQUEOUS SECONDARY BATTERY USING THE SAME

BACKGROUND OF THE INVENTION

1. Field of the Invention

The present invention relates to an active material for non-aqueous secondary battery, and a non-aqueous secondary battery using the same.

2. Description of the Related Art

With the rapid advance of portable and cordless electronic equipment, non-aqueous secondary batteries which can realize smaller size, lighter weight and larger capacity compared with conventional secondary batteries have been developed. Among them, a lithium secondary battery is already put to practical use as power sources; for a portable telephone and a notebook personal computer. Batteries of large size and high output have also been studied as power sources for electric vehicles. Since a non-aqueous electrolyte solution dissolving a supporting salt in a flammable organic solvent; and a flammable polymer electrolyte are used for a non-aqueous secondary battery, needs of safety securing means are increasing along with the tendency of batteries having higher energy density and larger size. Development of an active material having improved safety while maintaining high performance has been earnestly required.

As a method for improving the safety of an active material, studies have been performed actively, for example, a part of nickel of lithiated nickel dioxide used for a cathode is substituted by other element, such as aluminum, and although the safety is improved, there has been a problem of capacity falling.

Moreover, studies for improving the safety of a large-sized battery have been conducted, with using spinel type lithium manganese oxide which is a material having high safety as a cathode active material. However, in case of spinel type lithium manganese oxide, when the charging/discharging at a high temperature is repeated, the capacity falling occurs quickly, namely, there is a problem that a high-temperature cycle characteristic is inferior. In order to improve this point, lithium rich composition (Li/Mn>0.5) or substitution of a part of manganese by other element, such as chromium, is studied, but it results to reduce the already small capacity of 4V region further, thus, the coexistence of the safety and the battery performance is difficult.

The object of the present invention is to solve the above-mentioned problem, and to provide an active material for non-aqueous secondary battery having improved safety with maintaining the capacity and the cycle characteristic, and a non-aqueous secondary battery using the same.

SUMMARY OF THE INVENTION

As a result of extensive studies, the present inventors have found that an active material for non-aqueous secondary battery having improved safety with maintaining the capacity and the cycle characteristic can be obtained by that: the active material is an active material that can be doped/undoped with an alkali metal ion; the active material is a compound particle comprising three or more of constituting elements; and the active material has a region where concentration of one constituting element selected from a specific group is decreasing continuously in the direction of from the particle surface to the particle core; and the ratio of the mean width of this region towards the depth direction to the mean radius of the particle is in a specific range, and accomplished the present invention.

That is, the present invention relates to:

[1] an active material for non-aqueous secondary battery wherein the active material can be doped/undoped with an alkali metal ion; the active material is a compound particle comprising three or more of constituting elements, and contains an element A selected from Li, Na, K, Mg, Ca, Sr, Ba, B, Al, Ga, In, Si, Zr, Sn, Ti, V, Cr, Mn, Fe, Co, Ni, Cu, Ag and Zn as one of the constituting elements; the particle has a region where the concentration of element A is decreasing continuously in the direction of from the particle surface to the particle core; and the ratio (d/D) of the mean width (d) of this region towards the depth direction to the mean radius (D) of the particle is $0.001 < d/D < 0.5$.

Further, the present invention relates to:

[2] a process for preparing the active material for non-aqueous secondary battery of the above [1] comprising the first process of obtaining an active material that can be doped/undoped with an alkali metal ion by heat-treatment of a raw material compound and the second process of conducting heat-treatment after coating-treatment of the active material with a compound containing the element A, and the heat-treatment time in the second process is shorter than that in the first process.

Furthermore, the present invention relates to:

[3] a non-aqueous secondary battery, wherein the active material for non-aqueous secondary battery of the above [1] is used as an active material of a cathode and/or an anode.

DETAILED DESCRIPTION OF THE INVENTION

The active material for non-aqueous secondary battery of the present invention is an active material that can be doped/undoped with an alkali metal ion. The active material is a compound particle which comprises three or more of constituting elements, and contains an element A selected from Li, Na, K, Mg, Ca, Sr, Ba, B, Al, Ga, In, Si, Zr, Sn, Ti, V, Cr, Mn, Fe, Co, Ni, Cu, Ag and Zn as one of the constituting elements. The particle has a region where the concentration of element A is decreasing continuously in the direction of from the particle surface to the particle core; and the ratio (d/D) of the mean width (d) of this region towards the depth direction to the mean radius (D) of the particle is $0.001 < d/D < 0.5$.

When the element A is not distributed in a particle so that there is a region where the concentration of element A is decreasing continuously from the particle surface to the particle core, deterioration of the cycle characteristic of battery is remarkable. When the ratio d/D is 0.001 or less, where d is the mean width of the region towards the depth direction where the concentration of element A is decreasing continuously from the particle surface to the particle core, and D is the mean radius of the particle, the adding effect of element A is hardly exhibited. On the other hand, when d/D is 0.5 or more, the capacity falling becomes remarkable. In order to make capacity falling still small, and to exhibit the effect of the element A much more, it is suitably in $0.01 < d/D < 0.3$.

The ratio d/D of the mean width d towards the depth direction of the region where the concentration of element A is decreasing continuously from the particle surface to the particle core, to the mean radius D of the particle can be determined as follows.

That is, the compound particle is dissolved in an acid etc. sequentially by a unit of about 0.5 to 1% of the whole compound particle. Each solution is analyzed by ICP emission spectroscopy method, and "the molar fraction of element A to the sum of element A and other constituting elements" of each solution is calculated.

Here, the above-mentioned other constituting elements can be selected arbitrarily, as long as the constituting element exists in a constant concentration at least whole of the one particle.

The region where the molar fraction of the above element A decreases continuously from the particle surface to the particle core until it becomes almost constant is "a region where the concentration of element A is decreasing continuously".

And d/D is calculated, by selecting a constituting element which exists over the whole particle in a constant concentration, from the amount of the constituting element in "the region which is decreasing continuously", and the amount of said constituting element in other regions, assuming that the particle is a spherical form, and the particle changes in the state reducing the radius by dissolution with maintaining the similarity of spherical form.

The region of decreasing continuously in the direction of from the particle surface to the particle core does not need to start from the particle surface. Moreover, 1 or 2 or more of the regions may exist.

When the above region where the concentration of element A is decreasing continuously in the direction of from the particle surface to the particle core is, for example, a solid solution such as $Li(Ni_{1-x}Al_x)O_2$ ($0 \leq x \leq 1$) or $Li(Mn_{2-y}Al_y)O_4$ ($0 \leq y \leq 1$), since deterioration of the cycle characteristic of a battery is small, it is suitable.

In case of the active material that can be doped/undoped with an alkali metal ion contains at least one transition-metal element different from element A as a constituting element, if the ratio Mba/Msa, where Mba is the molar fraction of element A to the total of element A and a transition-metal element in the inner layer of the particle and Msa is the molar fraction of element A to the total of element A and a transition-metal element in the surface layer of the particle, is 0.7 or less, the capacity decreasing can be suppressed further, and it is suitable. The transition metal element means an atom having imperfectly filled d shell, or an element which produces such a cation.

Here, Msa and Mba can be determined by: dissolving a compound particle in an acid etc. sequentially according to the above method; analyzing the composition of each solution by ICP emission spectroscopy method; and calculating "the molar fraction of element A to the sum of element A and other constituting elements".

And Msa is a molar fraction of element A in this dissolution liquid which is the first dissolution liquid dissolved sequentially in an amount of about 0.7% of the whole compound particle.

Moreover, Mba is a molar fraction of element A, where the molar fraction of element A of dissolution liquid becomes almost constant, after continuous decrement of each of the dissolution liquid obtained by dissolving sequentially in the direction of from the particle surface to core.

Examples of the active material that can be doped/undoped with an alkali metal ion include: composite chalcogen compound particles, such as oxide, sulfide, etc. containing Li and a transition metal; composite chalcogen compound particles, such as oxide, sulfide, etc. containing Na and a transition metal, etc. Among these, as a compound particle used as an active material of the lithium secondary battery, preferable is the compound oxide particle containing Li and a transition metal such as: lithiated cobalt dioxide; lithiated nickel dioxide; lithiated nickel dioxide whose nickel is partly substituted by other elements such as cobalt, etc.; spinel type lithium manganese oxide; spinel type lithium manganese oxide substituted partly by other elements; $LixMnO_2$ which are not spinel type structure such as zigzag layered structure; oxides of lithium and titanium, such as $LixTi_2O_4$, and $Li_{4/3}Ti_{5/3}O_4$; oxide of lithium and vanadium, such as $LixV_2O_4$, and $LixV_2O_5$, $LixV_6O_{13}$; oxide of lithium and chromium, such as $LixCr_3O_8$; oxide of lithium and iron, such as $LixFe_5O_8$, etc.

When the active material that can be doped/undoped with an alkali metal ion is a compound particle having $\alpha$-$NaFeO_2$ type crystal structure containing Li, and Ni and/or Co, it is suitable that Al is used as element A, since the effect of improving safety is remarkable.

Moreover, when the compound particle is a compound oxide particle having spinel type crystal structure containing Li and Mn, it is suitable that element A is selected from Li, Mg, B, Al, Ga, Si, Ti, V, Cr, Fe, Co, Ni, Cu, Ag and Zn, since the capacity falling is more small.

The process for producing the active material of the present invention comprises, without being limited, the first process of obtaining an active material (compound particle) that can be doped/undoped with an alkali metal ion by heat-treating a raw material compound, and the second process conducting heat-treatment after coating-treatment of the active material (compound particle) with a compound containing a constituting element A.

According to the manufacture method that the heat-treatment time in the second process is shorter than that in the first process, the desired distribution state of element A is easily realizable, and the unevenness among the particles at the time of large amount manufacturing can be made small, thus it is suitable. Here, the manufacture method of the present invention may include processes other than the first and the second process. The raw material compound can be suitably chosen according to the desired active material.

The heat-treatment is, for example, firing for reacting a raw material compound, drying for dehydration, or heating for performing phase transfer or improving crystallinity, etc. At the first process and at second process, the temperature of heat-treatment may be the same or different.

The atmosphere of heat-treatment can be chosen from the air as well as oxygen, nitrogen, carbon dioxide, water steam, nitrogen oxide, hydrogen chloride, hydrogen sulfide, and mixed gas thereof, according to the desired active material, at either of reduced or not reduced pressure.

The first process is not especially limited, and a well-known method can be used such as firing after mixing raw material compounds containing the constituting elements of active material that can be doped/undoped with an alkali metal ion.

As the compound containing element A used for the coating-treatment in the second process, oxide, hydroxide, oxyhydroxide, sulfate, carbonate, nitrate, acetate, chloride, organometallic compound, alkoxide, etc. which contain the element A are exemplified.

Examples of coating-treatment process include: a process of dissolving a compound containing element A in water or an organic solvent to produce a solution, and dispersing an active material (compound particle) to be coated in the solution, and drying; a process of dispersing a compound containing constituting element A together with an active material (compound particle) to be coated thereof in water or an organic solvent, and drying; and a process of adhering the compound containing constituting-element A by CVD, or vapor deposition on the surface of the active material (compound particle) to be coated.

Among these, suitable is a process of dissolving an alkoxide in an organic solvent, and dispersing an active material (compound particle) to be coated in the solution, and drying, because the coating of uniform and strong adhesion can be obtained easily.

When an alkoxide containing element A is used as a compound containing element A, it is suitable that after coating, further hydrolyzing, then heat-treatment is performed, because it can prevent losing element A contained in the alkoxide due to evaporation or pyrolysis of the alkoxide in heat-treatment process.

When the active material for lithium secondary battery which has the crystal structure of $\alpha$-NaFeO$_2$ type or a spinel type is obtained by said manufacture method, the active material (compound particle) obtained in the first process is suitably as that having lithium rich composition. Concretely, in case that the active material (compound particle) is the $\alpha$-NaFeO$_2$ type crystal structure containing lithium, nickel, and/or cobalt, the molar ratio of Li to Ni and/or to Co is suitably more than 1, and more suitably 1.03 or more. Moreover, in case that the active material (compound particle) is the spinel type crystal structure containing Li and Mn, the molar ratio of Li to Mn is suitably more than 0.5, and more suitably 0.53 or more. By making the active material (compound particle) obtained in the first process to be lithium rich composition, desired distribution of element A can be realized, especially formation of a solid solution region can be realized easily.

The active material of the present invention can be used for a non-aqueous secondary battery and it can be used not only for a cathode but also for an anode. Below, suitable compositions at the time of producing a battery will be explained, as an example, in case of using it for a cathode of lithium secondary battery.

As the cathode of the lithium secondary battery which is one of the embodiments of the present invention, exemplified are those which comprise the compound of the present invention as an active material mentioned above, and as other components, a carbonaceous material as a conductive substance, and a thermoplastic resin as a binder, etc.

As the carbonaceous materials, natural graphite, artificial graphite, coke, carbon black, etc. are exemplified. It can be used alone or in combination as a composite conductive substance, for example, mixed with artificial graphite and carbon black.

As the thermoplastic resins, poly(vinylidene fluoride) (hereinafter, may be referred to as PVDF), polytetrafluoroethylene (hereinafter, may be referred to as PTFE), tetrafluoroethylene-hexafluoropropylene-vinylidene fluoride copolymer, hexafluoropropylene-vinylidene fluoride copolymer, tetrafluoroethylene-perfluorovinyl ether copolymer, etc. are exemplified. These may be used alone or in combination of two or more.

Moreover, when a fluororesin and a polyolefin resin are used as a binder combining with the cathode active material of the present invention so that the amount of the fluororesin in a cathode composition is 1 to 10% by weight and the amount of the polyolefin resin is 0.1 to 2% by weight, binding property with a current collector is excellent, and the safety to external heating represented by heating test can be improved further, and it is preferable.

As the cathode current collectors, Al, Ni, stainless steel, etc. can be used, and Al is preferable as it is easily processed into thin film, and cheap. Examples of the process of applying the composition containing a cathode active material to the cathode current collector include: a process of conducting press forming; and a process of pasting using a solvent, and adhering by pressing on a current collector after coating and drying.

As the anode of the lithium secondary battery which is one of the embodiments of the present invention, for example, lithium metal, lithium alloy, or a material that can be doped/undoped with a lithium ion, etc. can be used. As the material that can be doped/undoped with a lithium ion, exemplified are carbonaceous materials such as natural graphite, artificial graphite, cokes, carbon black, pyrolytic carbons, carbon fibers and fired products of organic polymer compounds; and chalcogen compounds, such as oxide and sulfide which can be doped/undoped with a lithium ion at a lower electric potential than in cathode. As the carbonaceous materials, carbonaceous material mainly consisting of graphite material, such as natural graphite and artificial graphite, is suitable. When it is combined with a cathode, since electric potential flatness is high, and mean discharging electric potential is low, high energy density can be obtained.

Moreover, in case of using in combination with a liquid electrolyte, when the electrolyte of the liquid does not contain ethylene carbonate, an anode containing poly (ethylene carbonate) is preferably used to improve a cycle characteristic and a large-current discharging characteristic.

The carbonaceous material can be in any shape including a flaky shape like natural graphite, a spherical shape like mesocarbon micro-beads, a fibrous shape like graphitized carbon fiber and an agglomerate of fine powders. If required, a thermoplastic resin can be added as a binder. Examples of the thermoplastic resin include PVDF, polyethylene, polypropylene and the like.

Examples of the chalcogen compound such as oxide and sulfide used as the anode, include crystalline or amorphous oxides comprised of a group XIII element, a group XIV element or a group XV element of the periodic law, such as amorphous compounds essentially comprised of tin compounds. Similarly to the above, there can be added, as required, a carbonaceous material as the conductive substance, or a thermoplastic resin as the binder.

Examples of the anode current collector include Cu, Ni, stainless steel and the like. Above all, Cu is preferably used in the lithium secondary battery because Cu hardly combines with lithium to form an alloy and is readily processed into a thin film. Examples of the process of applying the composition containing an anode active material to the anode current collector include: a process of conducting press forming; and a process of pasting using a solvent, and adhering by pressing on a current collector after coating and drying.

Examples of the separator used in the lithium secondary battery of the present invention include non-woven or woven fabrics of: fluororesins; olefin resins such as polyethylene, polypropylene and the like; nylon; and aromatic aramid. In the light of a higher energy density per volume and a smaller internal resistance, the separator preferably has the smallest possible thickness as long as the mechanical strength is secured. A preferred thickness thereof is in the range between 10 and 200 $\mu$m.

Examples of the electrolyte employed by the lithium secondary battery according to the invention include a nonaqueous electrolyte solution in which a lithium salt is dissolved in an organic solvent, and any one of the known solid electrolytes. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO2)_3$, $Li_2B_{10}Cl_{10}$, lower aliphatic lithium carboxylate, $LiAlCl_4$ and the like. These salts may be used alone or in combination thereof.

Examples of the organic solvent usable for the nonaqueous electrolyte for the lithium secondary battery according to the invention include: carbonates such as propylene carbonate, ethylene carbonate, dimethyl carbonate, diethyl carbonate, ethyl methyl carbonate, 4-trifluoromethyl-1,3-dioxolane-2-one, 1,2-di(methoxycarbonyloxy)ethane and the like; ethers such as 1,2-dimethoxyethane, 1,3-dimethoxypropane, pentafluoropropyl methyl ether, 2,2,3,3-tetrafluoropropyl difluoromethyl ether, tetrahydrofuran, 2-methyl tetrahydrofuran and the like; esters such as methyl formate, methyl acetate, γ-butyrolactone and the like; nitriles such as acetonitrile, butyronitrile and the like; amides such as N,N-dimethylformamide, N,N-dimethylacetoamide and the like; carbamates such as 3-methyl-2-oxazolidone and the like; sulfur-containing compounds such as sulfolane, dimethylsulfoxide, 1,3-propane sultone and the like; and the above organic solvents with a substituent including fluorine introduced therein. Normally, two or more compounds of the above are used in combination. Above all, a mixed solvent containing a carbonate is preferred and more preferred is a mixed solvent of a cyclic carbonate and a non-cyclic carbonate or of a cyclic carbonate and an ether.

As the mixed solvent of a cyclic carbonate and a non-cyclic carbonate, preferred is a mixed solvent containing ethylene carbonate, dimethyl carbonate and ethyl methyl carbonate, because such a mixed solvent provides a wide operating temperature range, an excellent load characteristic and hardly decomposes even when the graphite material such as natural graphite and artificial graphite is used as an anode active material.

Moreover, when the active material which consists of three or more of elements that can be doped/undoped with an alkali metal ion have the α-$NaFeO_2$ type crystal structure containing Li, Ni, and/or Co, and the element A is Al, it is suitable to use the electrolyte containing a lithium salt containing fluorine, such as $LiPF_6$, and/or an organic solvent having substituent including fluorine, in the point that the excellent effect of improving safety can be obtained. The mixed solvent comprising an ether having substituents including fluorine, such as pentafluoropropyl methyl ether and 2,2,3,3-tetrafluoropropyl difluoromethyl ether; and dimethyl carbonate is excellent also in the large-current discharging characteristic, and is still suitable.

As the solid electrolyte, polymer electrolytes such as polyethylene oxide polymer compounds and polymer compounds containing at least one of a polyorganosiloxane branch or polyoxyalkylene branch can be used. Additionally, also usable is a so-called gel-type electrolyte in which a nonaqueous liquid electrolyte is maintained by a polymer. Further, in point of improving safety, sulfide electrolytes such as of $Li_2S$-$SiS_2$, $Li_2S$-$GeS_2$, $Li_2S$-$P_2S_5$, $Li_2S$-$B_2S_3$ and the like, and inorganic compound electrolytes comprising sulfides such as $Li_2S$-$SiS_2$-$Li_3PO_4$, $Li_2S$-$SiS_2$-$Li_2SO_4$ and the like, can be used.

The lithium secondary battery of the present invention is not particularly limited in shape and may have any one of the shapes such as a paper-sheet shape, a coin-like shape, a cylindrical shape and a rectangular parallelepiped shape.

EXAMPLES

Hereafter, although the present invention is explained by the examples still in detail, the present invention is not limited to these at all. In addition, unless otherwise particularly noted, the electrode for charging/discharging tests and a plate battery were produced according to the following method.

Into a mixture of compound particle that can be doped/undoped with an alkali metal ion which is an active material, and conductive substance of acetylene black, as a binder 1-methyl-2-pyrrolidone (hereinafter, may be referred to as NMP) solution of PVDF was added in the ratio of active material : conductive substance: binder=86:10:4 (weight ratio), and kneaded to obtain a paste. The paste was coated on #100 stainless steel mesh as a current collector, and dried under vacuum at 150° C. for 8 hours to obtain an electrode.

A plate battery was produced, by combining the resultant electrode with: a solution as an electrolyte, where $LiPF_6$ was dissolved to be 1 mol/liter, in a mixed solution of ethylene carbonate (hereinafter, may be referred to as EC), dimethyl carbonate (hereinafter, may be referred to as DMC), and ethyl methyl carbonate (hereinafter, may be referred to as EMC) in a ratio of 30:35:35, (hereinafter, may be referred to as $LiPF_6$/EC+DMC+EMC); polypropylene microporous membrane as a separator; and a lithium metal as a counter electrode (anode).

Comparative Example 1
(1) Synthesis of a Compound Particle

First, lithium hydroxide was dissolved in ion-exchanged water, and adjusted the pH to about 11. Subsequently, aluminum hydroxide was added and dispersed well. Next, lithium nitrate was dissolved. Then, after adding basic nickel carbonate and basic cobalt carbonate, respectively, and being mixed well, it was ground in a circulation pipe type mill. The mixing ratio of each element was set as the following composition in a molar ratio.

Li:Al:Co:Ni=1.03:0.05:0.10:0.85

The resultant slurry was dried with a spray dryer equipped with a rotary atomizer, and mixed fine particles of metal compounds were obtained. The temperature of supplied hot blast was about 245° C., and the outlet temperature of the dryer was about 145° C. The resultant mixed fine particles of metal compounds were put into a tubular furnace having an alumina core tube. After firing at 720° C. in a stream of oxygen for 15 hours, it was once ground. Furthermore, it was fired at 750° C. for 10 hours. The powdered compound particle (hereinafter, may be referred to as "compound particle R1") used as the active material of a non-aqueous secondary battery was obtained. The resultant compound particle R1, was confirmed to have α-$NaFeO_2$ type structure by powder X-ray diffraction.
(2) Composition Analysis in the Depth Direction of a Particle 10 ml of sulfuric acid having a concentration of 1 mol/liter was added to 0.1 g of the compound particle R1, and after stirring for about 10 seconds, it was filtrated through 0.1 μm filter. In the same manner, the filtrate was processed with sulfuric acid repeatedly (20 times). After adding hydrochloric acid, each filtrate was made to a determined volume. The final residue was dissolved completely by adding hydrochloric acid, and made to a determined volume. The amount of Al, Co, and Ni was determined by ICP-AES, in each resultant solution, to show the composition ratio Al/(Al+Co+Ni) were a constant value of about 0.050.

(3) Evaluation of the Charging/discharging Performance as a Cathode Active Material for Lithium Secondary Battery A plate battery was produced using the resultant compound particle R1, and a charging/discharging test by constant current and voltage charging and constant current discharging was carried out, according to the following conditions.

Maximum charging voltage 4.3V, charging time 8 hours, charging current 0.5 mA/cm$^2$, Minimum discharging voltage 3.0V, discharging current 0.5 mA/cm$^2$ The discharging capacities at $10^{th}$ and $20^{th}$ cycles were high capacity of 185 and 182 mAh/g, respectively, and showed good cycle characteristics.

(4) Evaluation of Safety

In order to evaluate safety by investigating the reaction behavior at the time of being heated in a deeply charged state, sealed type DSC measurement was conducted according to the following procedure. First, using the compound particle R1, a plate battery was produced with combining a lithium metal, and constant current and voltage charging was performed in a conditions of charging voltage 4.3V, charging time 20 hours, and charging current 0.4 mA/cm$^2$. Next, the battery was disassembled in a glove box of argon atmosphere. After taking out the cathode, and washing and drying by DMC, raked up the cathode composition from the current collector and the charged cathode composition as a sample was obtained.

Then, 0.8 mg of charged cathode compositions was weighed in a sealed cell made from stainless steel. A nonaqueous electrolyte solution, LiPF$_6$ dissolved into 5:50:25:20:5 mixed-solutions of EC, DMC and EMC, 2,2,3,3-tetrafluoropropyl difluoromethyl ether, and vinylene carbonate so that it is made to be 1.3 mol/liter, 1.5 microliters thereof was injected so that the charged cathode composition may get wet, and the cell was sealed using a jig.

Then, a cell made from stainless steel in which the above sample was sealed up, was set to DSC220 made by Seiko Instruments Inc., and measured at a raising temperature speed of 10° C. /min. Although the exothermic peak was observed, the peak form was not very sharp spike-like form as typically shown in thermal runaway. Thus it turns out to have safe behavior.

Example 1

(1) Synthesis of a Compound Particle

In a glove box of argon atmosphere, predetermined amount of aluminum isopropoxide (hereinafter, may be referred to as AIPO) was dissolved in 2-propanol (hereinafter, may be referred to as IPA) which dehydrated sufficiently by molecular sieves, the compound particle R1 was dispersed, and then, it was taken out from the glove box, IPA was evaporated by a rotary evaporator, and the surface of the compound particle R1 was coated with AIPO. Here, the ratio of Al in coated AIPO to Ni in the compound particle R1 was set to be Al:Ni=0.02:0.85 in a molar ratio. Next, after hydrolyzing by allowing to stand for 19 hours in a thermo-hygrostat maintained at a temperature of 30° C. and a relative humidity of 70%, it was dried in vacuum at 50° C. for 4 hours. The resultant dried product was put into a tubular furnace having an alumina core tube, and fired at 720° C. in a stream of oxygen for 1 hour, powdery compound particles (hereinafter, may be referred to as "compound particle E1") used as the active material of a nonaqueous secondary battery were obtained. The resultant compound particle E1 was confirmed to have α-NaFeO$_2$ type structure according to powder X-ray diffraction.

(2) Composition Analysis in the Depth Direction of a Particle

Except having used the compound particle E1 instead of the compound particle R1 as the same manner with Comparative Example 1, the composition ratio Al/(Al+Co+Ni) was determined, in each resultant solution obtained by partial and serial dissolution, the amount of Al, Co, and Ni was determined by ICP-AES. The ratio Al/(Al+Co+Ni) of the resultant filtrate at the 1st time was 0.125. The dissolved amounts of Ni at this time was 0.7% of all Ni. The obtained ratio of 0.125 was equivalent to the particle surface (Msa=0.125). Although the composition ratio Al/(Al+Co+Ni) decreased continuously henceforth from 2nd to the 11th time. (The total dissolved amount of nickel until to the 11th time are 9.1% of all nickel. And when this is converted into the depth of radius direction from the surface, the ratio of the width of depth direction to the particle radius of this region is calculated to 0.03.) The composition ratios Al/(Al+Co+Ni) after the 12th time were constantly about 0.059 (Mba=0.059). That is, the compound particle E1 has the region where concentration of aluminum is decreasing continuously in the direction of from the particle surface to the particle core. And the width d of depth direction of this region is 0.03 to the particle radius D. The ratio Mba/Msa, where Mba is a molar fraction of element A to the total of element A and a transition-metal element in the inner layer of the particle and Msa is a molar fraction of element A to the total of element A and a transition-metal element in the surface layer of the particle, was about 0.472. Thus Mba/Msa was below 0.7.

TABLE 1

| Analyzing times | Dissolved amount of Ni (%) | Al/(Al + Co + Ni) (molar ratio) |
| --- | --- | --- |
| 1 | 0.69 | 0.1250 |
| 2 | 0.70 | 0.0985 |
| 3 | 0.83 | 0.0808 |
| 4 | 0.92 | 0.0744 |
| 5 | 0.97 | 0.0706 |
| 6 | 1.00 | 0.0687 |
| 7 | 0.97 | 0.0628 |
| 8 | 0.69 | 0.0681 |
| 9 | 0.83 | 0.0642 |
| 10 | 0.79 | 0.0615 |
| 11 | 0.70 | 0.0634 |
| 12 | 0.78 | 0.0570 |
| 13 | 0.83 | 0.0570 |
| 14 | 0.68 | 0.0606 |
| 15 | 1.41 | 0.0596 |
| 16 | 0.74 | 0.0580 |
| 17 | 0.77 | 0.0607 |
| 18 | 0.64 | 0.0580 |
| 19 | 0.65 | 0.0606 |

(3) Evaluating of the Charging/discharging Performance as a Cathode Active Material for Lithium Secondary Battery A plate battery was produced using the resultant compound particle E1. A charging test by constant current and voltage charging and constant current discharging was carried out on the same conditions as Comparative Example 1. The discharging capacities of 10th and 20th cycle were, respectively, 180 and 177 mAh/g. The capacity fell slightly compared with Comparative Example 1, but it was still considerably high capacity to show a good cycle characteristic.

(4) Evaluation of Safety

Except having used the compound particle E1 instead of the compound particle R1, sealed type DSC measurement was conducted in the same manner as Comparative Example 1. Although an exothermic peak was observed, the peak form was not very sharp spike-like form as typically shown in thermal runaway. Thus it turns out to have safe behavior. Furthermore, the exothermic peak temperature has shifted to a high temperature side by 17° C. compared with Comparative Example 1. Thus the safety was shown to be more improved.

According to the present invention, provided are a non-aqueous active material for secondary battery having improved safety with maintaining capacity and cycle characteristic, and a non-aqueous secondary battery using the same, which has an extremely large value in industry.

What is claimed is:

1. An active material for non-aqueous secondary battery wherein the active material can be doped/undoped with an alkali metal ion; the active material is a compound particle comprising three or more of constituting elements, and contains an element A selected from Li, Na, K, Mg, Ca, Sr, Ba, B, Al, Ga, In, Si, Zr, Sn, Ti, V, Cr, Mn, Fe, Co, Ni, Cu, Ag and Zn as one of the constituting elements; the particle has a region where the concentration of element A is decreasing continuously in the direction of from the particle surface to the particle core; and the ratio (d/D) of the mean width (d) of this region towards a depth direction extending from the surface toward the center of the particle to the mean radius (D) of the particle is 0.001<d/D<0.5.

2. The active material for non-aqueous secondary battery according to claim 1, wherein the active material contains at least one transition-metal element different from the element A, and the ratio Mba/Msa is 0.7 or less where Mba is a molar fraction of element A to the total of element A and a transition-metal element in the inner layer of the particle and Msa is a molar fraction of element A to the total of element A and a transition-metal element in the surface layer of the particle.

3. The active material for non-aqueous secondary battery according to claim 1 or 2, wherein the region where the concentration of element A is decreasing continuously in the direction of from the particle surface to the particle core is a solid solution.

4. The active material for non-aqueous secondary battery according to claim 1 wherein the active material that can be doped/undoped with an alkali metal ion is a compound oxide particle containing Li and a transition metal.

5. The active material for non-aqueous secondary battery according to claim 4 wherein the element A is Al, and the compound oxide particle has a $\alpha$-$NaFeO_2$ type crystal structure containing Li, and each or both of Ni and Co.

6. The active material for non-aqueous secondary battery according to claim 4 wherein the element A is an element selected from Li, Mg, B, Al, Ga, Si, Ti, V, Cr, Fe, Co, Ni, Cu, Ag and Zn, and the compound oxide particle has a spinel type crystal structure containing Li and Mn.

7. A process for preparing the active material for non-aqueous secondary battery of any one of claims 1 to 6 comprising the first process of obtaining an active material that can be doped/undoped with an alkali metal ion by heat-treatment of a raw material compound and the second process of conducting heat-treatment after coating-treatment of the active material with a compound containing the element A, and the heat-treatment time in the second process is shorter than that in the first process.

8. The process for preparing the active material for non-aqueous secondary battery according to claim 7 wherein the active material that can be doped/undoped with an alkali metal ion is a compound particle having $\alpha$-$NaFeO_2$ type crystal structure containing Li, and each or both of Ni and Co, and the ratio of Li to the sum of Ni and Co is larger than 1.

9. The process for preparing the active material for non-aqueous secondary battery according to claim 7 wherein the active material that can be doped/undoped with an alkali metal ion is a compound particle having spinel type crystal structure containing Li and Mn, and the molar ratio of Li to Mn is larger than 0.5.

10. A non-aqueous secondary battery, wherein the active material for non-aqueous secondary battery of claim 1 is used as an active material of each or both of a cathode and an anode.

* * * * *